H. BEARD.
VEHICLE BODIES.
No. 195,437. Patented Sept. 25, 1877.
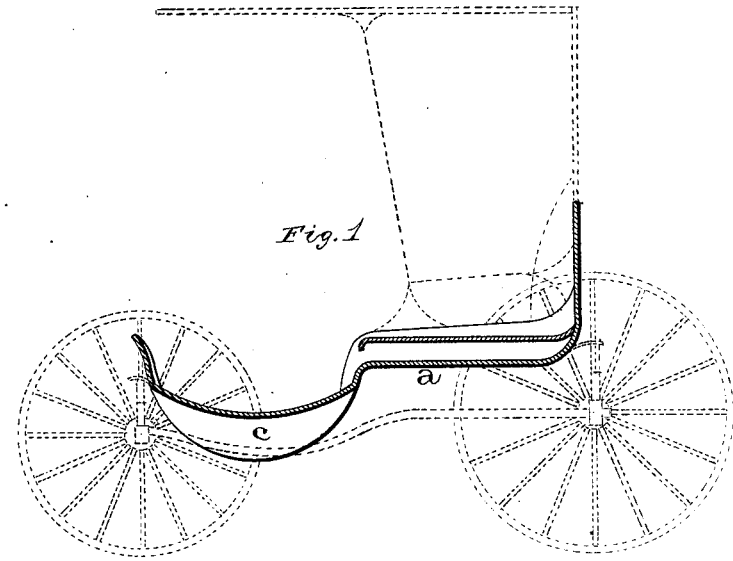
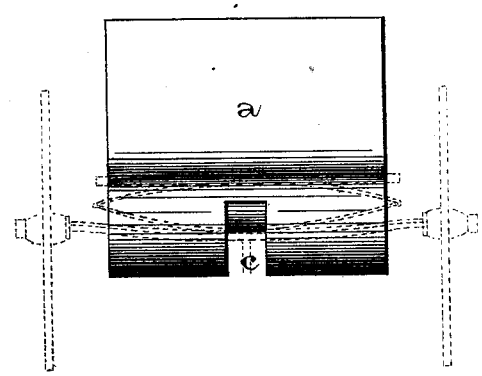
WITNESSES.
J. Wm. Garner
Will H. Kern
INVENTOR.
Horace Beard
per
F. A. Lehmann, Atty

UNITED STATES PATENT OFFICE.

HORACE BEARD, OF WILTON, NEW HAMPSHIRE.

IMPROVEMENT IN VEHICLE-BODIES.

Specification forming part of Letters Patent No. 195,437, dated September 25, 1877; application filed August 18, 1877.

*To all whom it may concern:*

Be it known that I, HORACE BEARD, of Wilton, in the county of Hillsborough and State of New Hampshire, have invented certain new and useful Improvements in Vehicles; and I do hereby declare the following to be a full, clear, and exact description of the invention, such as will enable others skilled in the art to which it pertains to make and use it, reference being had to the accompanying drawings, which form part of this specification.

My invention relates to an improvement in vehicles; and it consists of a longitudinal recess in the bottom of the front part of the body of the vehicle for the reach to pass through, or to occupy while the body rises and falls upon the springs.

The accompanying drawings represent my invention.

a represents the body of a carriage or any similar vehicle, which has the recess c through its front part, as shown. This recess extends longitudinally through the middle of the body, and through this recess, or below it, passes the reach, which connects the rocker with the bed-piece. By means of this recess the body can be hung lower than that of a phaeton, while the wheels can be as large as those of common vehicles.

By means of my invention large wheels and a low body can be combined, thereby securing light draft, and ease in getting in and out.

Having thus described my invention, I claim—

A longitudinal recess in the under side of the body of a carriage or vehicle, substantially as shown and described.

In testimony that I claim the foregoing I have hereunto set my hand this 13th day of August, 1877.

HORACE BEARD.

Witnesses:
ABRAM A. RAMSEY,
LUKE BEARD.